United States Patent [19]

Dang et al.

[11] Patent Number: 4,847,893
[45] Date of Patent: Jul. 11, 1989

[54] METHOD FOR MONITORING TELEPHONE STATUS CHANGES

[75] Inventors: Mieu-Hong Dang; Nigel V. James; Elie A. Jreij; Jorge R. Taborga, all of Austin, Tex.

[73] Assignee: IBM Corporation, Santa Clara, Calif.

[21] Appl. No.: 246,478

[22] Filed: Sep. 19, 1988

[51] Int. Cl.$^4$ ...................... H04M 11/00; H04M 3/42
[52] U.S. Cl. ....................................... 379/95; 379/112; 379/208
[58] Field of Search .................. 379/34, 95, 111, 112, 379/208

[56] References Cited

U.S. PATENT DOCUMENTS 3,609,245 9/1971 Richter et al. ...................... 379/208

Primary Examiner—Stafford D. Schreyer
Attorney, Agent, or Firm—Andrew J. Dillon

[57] ABSTRACT

A method is disclosed for controlling the monitoring of telephone status changes by an associated processor. A status change inquiry message is transmitted from the associated processor to the telephone and is utilized to set an interrupt mode within the telephone. The status change inquiry message may also include a timer setting value which is utilized, in a preferred embodiment of the present invention, to determine a maximum duration for the interrupt mode. In response to a change in telephone status, or the termination of the timed interrupt mode, a single phone status message is sent to the associated processor and the interrupt mode is terminated. In this manner, a change in phone status may be determined by the associated processor without the necessity of continuously polling the telephone. Further, any transmission of a phone status change terminates the interrupt mode and prohibits the telephone from continuously interrupting the associated processor with status change messages.

8 Claims, 2 Drawing Sheets

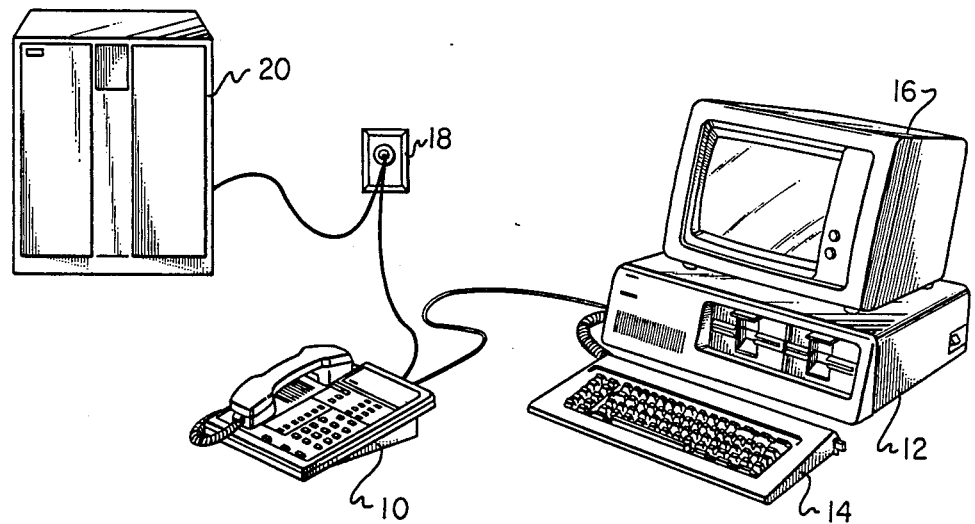
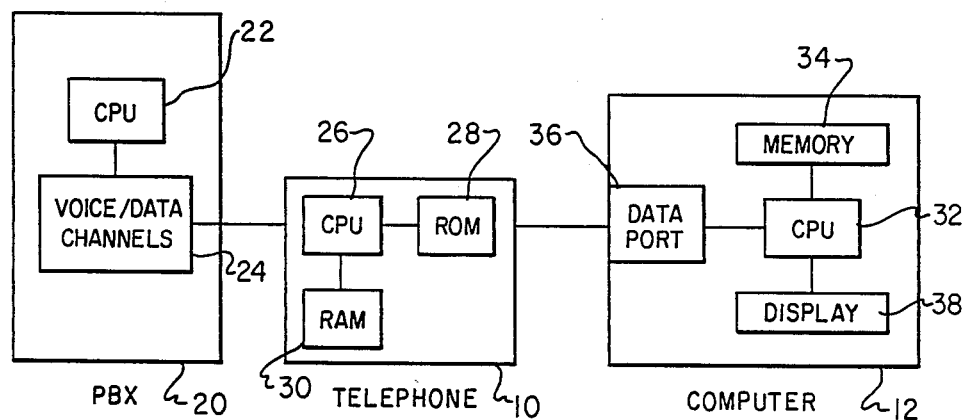

METHOD FOR MONITORING TELEPHONE STATUS CHANGES

BACKGROUND OF THE INVENTION

1. Technical Field

This invention relates in general to a method for monitoring the status of a telephone by an associated processor and in particular to methods which permit the telephone to interrupt the processor in response to a change in status thereof. Still more particularly, the present invention relates to methods which automatically generate a single interrupt message in response to either a change in telephone status or the termination of a selected time period.

2. Background Art

It is well known in the prior art to utilize computer program controlled telephone switching systems to interconnect individual telephone stations, digital terminals, personal computers and large main-frame computers. Such intercommunications may be utilized to provide voice and/or data communications. In a typical application, the telephone switching system is utilized to establish communication connections between two communication stations, both of which may included an associated computer facility connected to a communications pair. Thereafter, the operator generally utilizes a modem which converts digital signals output by a computer to analog signals suitable for transmission by the telephone system. Alternately, certain systems permit direct communication by digital signals over special communication pairs.

More recently, certain systems have been proposed which incorporate computer facilities which are directly connected to a communications pair. In such systems, the computer facility is utilized to emulate the functions of a telephone communication system. In this manner, the telephone communication station is no longer required for computer data call origination purposes.

In the first of the aforementioned systems it is desirable for the associated computer facility to be able to monitor the status of the associated communication station or telephone. This is generally accomplished by one of two methods. In a first method, the processor associated with the telephone must selectively and continuously "poll" the status of the telephone to determine whether or not a change in status has occurred. This technique is quite wasteful of processor time and makes it difficult for the processor to perform additional tasks.

A second technique whereby telephone status changes may be monitored by an associated processor involves the continuous interruption of the processor by the telephone in response to each and every change in telephone status. While this technique is less wasteful of processor time it also does not permit the processor to effectively perform additional tasks due to the repeated interruptions which telephone status changes generate.

It should therefore be apparent that a need exists for an efficient method whereby changes in telephone status may be indicated to an associated processor.

SUMMARY OF THE INVENTION

It is therefore one object of the present invention to provide an improved method for monitoring telephone status changes by an associated processor.

It is another object of the present invention to provide an improved method for monitoring telephone status changes by an associated processor without the necessity of continuous polling of the telephone by the processor.

It is yet another object of the present invention to provide an improved method for monitoring telephone status changes by an associated processor without the necessity of continuous interrupting of the processor by the telephone in response to each change in status.

The foregoing objects are achieved as is now described. A status change inquiry message is transmitted from an associated processor to the telephone and is utilized to set an interrupt mode within the telephone processor. The status change inquiry message may also include a timer setting value which may be utilized to determine a maximum duration for the interrupt mode. In response to a change in telephone status, or the termination of the timed interrupt mode, a single phone status message is sent to the associated processor and the interrupt mode is terminated. In this manner, a change in phone status may be determined by the associated processor without the necessity of continuously polling the telephone. Further, any transmission of a phone status change terminates the interrupt mode and prohibits the telephone from continuously interrupting the associated processor with status change messages.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a pictorial representation of a communication system which may be utilized in accordance with the method of the present invention;

FIG. 2 depicts a high level block diagram of the communication system of FIG. 1.

DETAILED DESCRIPTION OF THE PREFERRED EMBODIMENT

Figure 3:
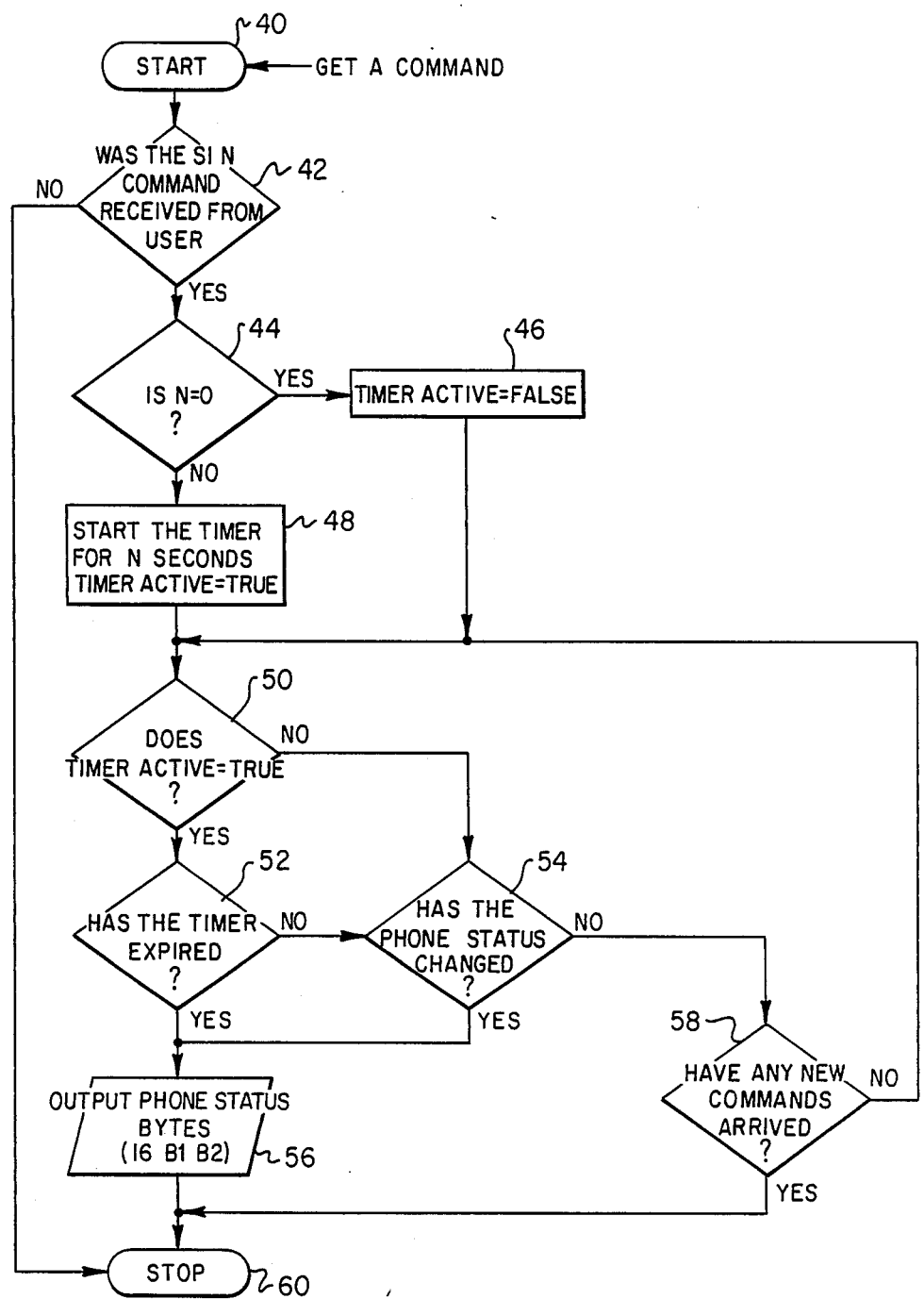
FIG. 3 depicts a logic flow chart illustrating the method of the present invention.

With reference now to the figures, and in particular with reference to FIG. 1, there is depicted a pictorial representation of a communication system which may be utilized in accordance with the method of the present invention. As may be seen, the communication system includes a telephone 10 which preferably permits both voice and data communication. Telephone 10 may be implemented utilizing any telephone having a data/telephony capability, such as the ROLMphone 244PC, manufactured by International Business Machines Corporation. Telephone 10 is coupled, via a standard EIA-232D cable to a serial asynchronous port within computer 12.

Computer 12 within the depicted system is preferably provided by utilizing an IBM Personal Computer, an IBM Personal System/2 or other similar system. As those skilled in this art will appreciate, computer 12 generally includes both a keyboard 14 and a video display device 16, which may be utilized to allow operator input and to provide user discernible messages to an operator of the communication system depicted.

In the system illustrated, telephone 10 may be utilized for data communications in a manner very similar to that of a modem due to the fact that the ROLMphone 244PC will support the AT command set which is utilized in most modems. To permit such communication, telephone 10 is connected to a telecommunication system such as a Private Branch Exchange (PBX) 20 which may be implemented utilizing the ROLM Computerized Branch Exchange (CBX). This connection is preferably made via a distributed wiring system which includes a plurality of telephone outlet 18.

Referring now to FIG. 2, there is depicted a high level block diagram of the communication system depicted in FIG. 1. As may be seen, telephone 10 preferably includes a Central Processing Unit (CPU) 26 as well as both Read-Only-Memory (ROM) 28 and Random-Access-Memory (RAM) 30, which may be utilized in a manner well known in the art to store the control sequences utilized by Central Processing Unit 26 to operate telephone 10 in accordance with the method of the present invention. In the depicted embodiment of the present invention, Central Processing Unit 26 is preferably implemented utilizing a Motorola 68000 processor. Of course, those skilled in this art will appreciate that telephone 10 will also include circuitry which supports a databus as well as the telephone and audio sections of telephone 10.

As is typical of communication systems of this type, Private Branch Exchange 20 also includes a Central Processing Unit 22 which may be utilized to control the activity of voice/data channels 24. Finally, computer 12 also includes a Central Processing Unit 32 which is coupled, in a manner well known in the computer art, to memory 34, data port 36 and display driver 38. Of course, memory 34 will generally consist of a combination of Read-Only-Memory and Random-Access-Memory as well as those types of memory typically supported on magnetic media such as floppy disk.

With reference now to FIG. 3, there is depicted a logic flow chart illustrating the method of the present invention. As is illustrated, the method of the present invention begins at block 40 where a command is received from the operator of computer 12. Such commands are coupled, via data port 36 to telephone 10 (see FIG. 2). Central Processing Unit 26 within telephone 10 responds to such commands and determines, as depicted in block 42, whether or not the command received was a Status Inquiry message.

In accordance with the method of the present invention, the Status Inquiry (SI) message is transmitted in a format which includes additional information regarding the manner in which the telephone will respond to changes in status. As depicted in FIG. 3, the format utilized by the Status Inquiry command is "SI N" where "N" is a number from zero to two hundred and fifty-five. When "N" is equal to zero, in accordance with the method of the present invention, the Status Inquiry message is utilized to set an Interrupt mode within the telephone for an indeterminate period of time. However, when "N" is a number from one through two hundred and fifty-five the Interrupt mode within the telephone is set for a period of time equal to "N" in seconds and the method of the present invention will operate as will be explained in greater detail herein.

Next, block 46 is utilized to illustrate those conditions wherein "N" is equal to zero. Block 46 then depicts the setting of a Timer Active flag to indicate that the Interrupt mode will be set for an indeterminate period. When "N" is not equal to zero, then block 48 depicts the starting of an internal timer within telephone 10 for a period of N seconds and the setting of the Timer Active flag to indicate a timed limit for the Interrupt mode.

At this point, block 50 illustrates a periodic determination on the part of Central Processing Unit 26 within telephone 10 as to whether or not the Timer Active flag is indicating the timer is running. If the timer is not running, block 54 depicts the determination of whether or not the phone status has changed and if so, block 56 illustrates the outputting of the phone status in a code recognizable by the associated processor.

In the event block 50 determines that the Timer Active flag is indicating that the timer has been running, then block 52 is utilized to determine whether or not the timer has expired, indicating the termination of the selected time period. If not, the process proceeds again to block 54 and a determination is made as to whether or not the phone status has changed. As above, if the phone status has changed, block 56 illustrates the outputting of the phone status to the associated processor and the process terminates as illustrated in block 60.

In the event that the phone status has not changed, as determined by block 54, then block 58 is utilized to determine whether or not any new commands have been received. If not, the process returns to block 50 to once again periodically determine whether or not the Timer Active flag indicating that the timer is running. In the event a new command has been received, the process immediately terminates the Status Inquiry command and the process terminates as indicated in block 60.

In a manner depicted herein, it should be obvious to those skilled in the art that the status of an associated telephone may be easily determined by an associated processor by transmitting a Status Inquiry message to the telephone. By utilizing the Status Inquiry message in the manner depicted herein it will be possible for the telephone to indicate a change in its status upon the occurrence of such change or at the termination of a selected period of time. In this manner, a single status change message is sent from the telephone to the associated processor and the processor is therefore not continuously interrupted by an indication of telephone status changes. While this technique does result in an unpredictable result where the communications application has been terminated within the associated processor, it does permit a much more efficient communication between the associated processor and telephone with regard to changes in telephone status.

While the invention has been particularly shown and described with reference to a preferred embodiment, it will be understood by those skilled in the art that various changes in form and detail may be made therein without departing from the spirit and scope of the invention.

We claim:

1. A method of communicating changes in telephone status to an associated processor, said method comprising the steps of:

transmitting a status change inquiry message from said associated processor to said telephone;

setting an interrupt mode at said telephone in response to reception by said telephone of said status change inquiry message; and transmitting a single status change message from said telephone to said associated processor in response to a change in telephone status while said interrupt mode is set.

2. A method of communicating changes in telephone status to an associated processor according to claim 1 further including the step of:

terminating said interrupt mode in response to transmission of said single status change message.

3. A method of communicating changes in telephone status to an associated processor according to claim 1 further including the step of:

terminating said interrupt mode in response to reception by said telephone of a subsequent message from said associated processor.

4. A method of communicating changes in telephone status to an associated processor, said method comprising the steps of:

transmitting a status change inquiry message from said associated processor to said telephone;

setting an interrupt mode at said telephone for a selected period of time in response to reception by said telephone of said status inquiry message; and transmitting a single status change message from said telephone to said associated processor in response to the termination of said selected period of time.

5. A method of communicating changes in telephone status to an associated processor according to claim 4 further including the step of:

transmitting a single status change message from said telephone to said associated processor in response to a change in telephone status at any time while said interrupt mode is set.

6. A method of communicating changes in telephone status to an associated processor according to claim 4 further including the step of:

terminating said interrupt mode in response to reception by said telephone of a subsequent message from said associated processor.

7. A method of communicating changes in telephone status to an associated processor according to claim 4 wherein said selected period of time is transmitted to said telephone in conjunction with said status change inquiry message.

8. A method of communicating changes in telephone status to an associated processor according to claim 4 wherein said selected period of time comprises a selected number of seconds which is less than two hundred and fifty-five.

* * * * *